Figure 6:
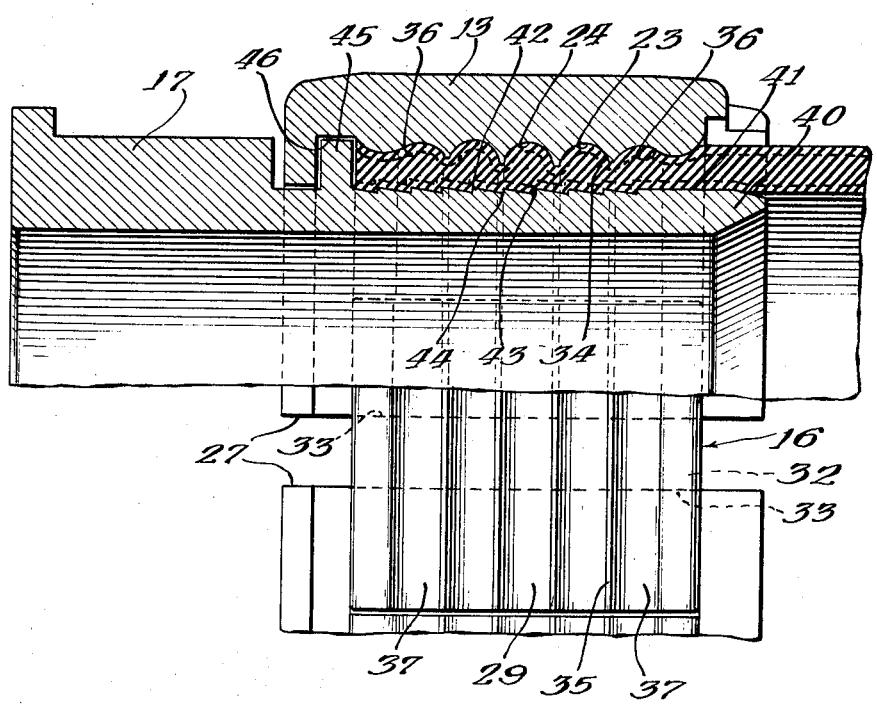

May 3, 1966  R. J. PETERMAN  3,249,371
FULL GRIP CLAMP
Filed Oct. 14, 1963  2 Sheets-Sheet 1
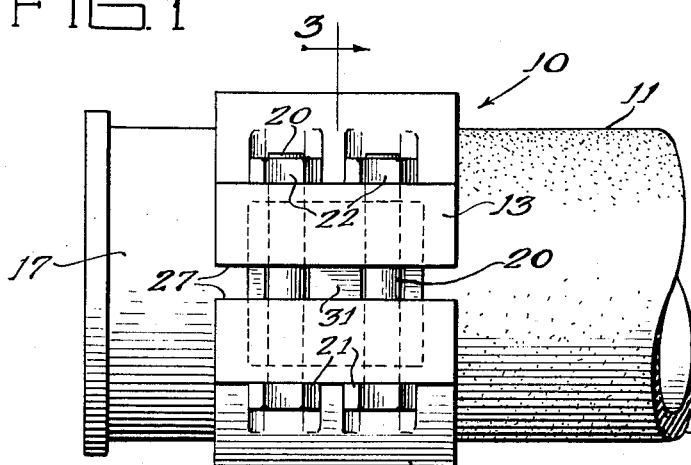
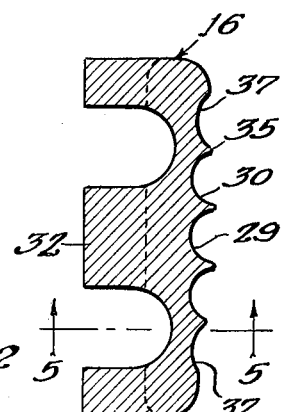
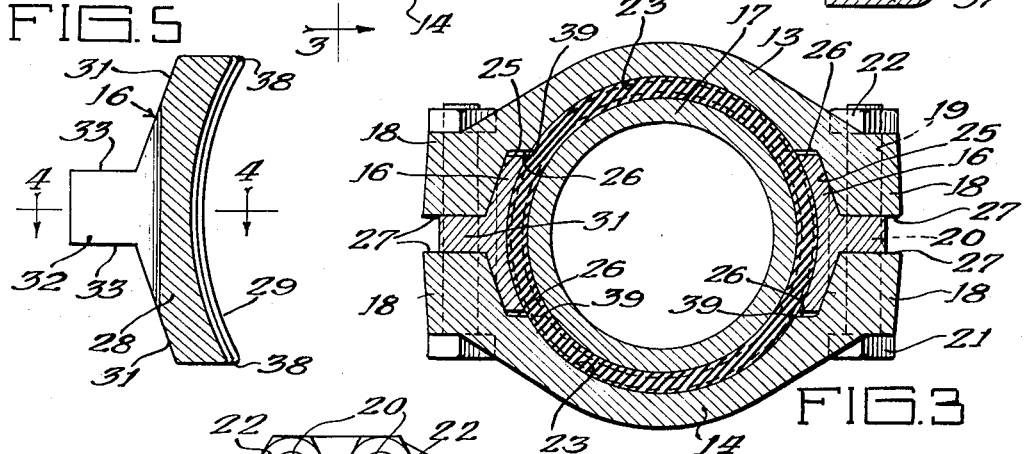
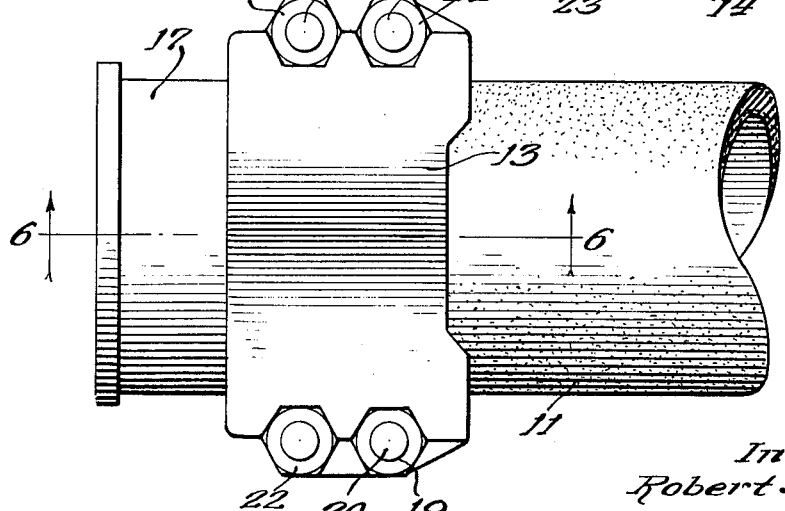
Inventor:
Robert J. Peterman
By: Hofgren, Wegner, Allen,
Stellman & McCord
Attorneys

United States Patent Office 3,249,371
Patented May 3, 1966

3,249,371
FULL GRIP CLAMP
Robert J. Peterman, Manitowoc, Wis., assignor to Imperial-Eastman Corporation, a corporation of Illinois
Filed Oct. 14, 1963, Ser. No. 315,998
7 Claims. (Cl. 285—253)

This invention relates to hose fittings and in particular to hose clamps.

Recent developments in the manufacture of high burst-plastic braid hose such as for marine use have presented a serious problem in the provision of fittings for use with such hose, as the existing fittings have not proven completely satisfactory in effectively positively connecting the hose particularly where relatively high fluid pressures have been employed. It has heretofore been common in the hose fitting art to employ clamp halves and segments cooperating with the clamp halves to engage the circumferential portion of the hose and clamp it against a suitable insert installed within the hose end. The present invention comprehends an improved construction of such hose couplings which has been found to solve the vexatious problem occasioned by the recent hose developments.

Thus, a principal object of the present invention is to provide a new and improved hose fitting.

Another object of the invention is to provide a new and improved hose clamp adapted for effecting positive secured connection to the end of a hose such as of the high burst-plastic braid type.

A further object of the invention is to provide such a hose clamp including an annular insert arranged to be inserted coaxially within a hose end for internally supporting a hose end, a pair of clamp-halves each having an internal arcuate clamping surface for engaging the hose to be clamped along a circumferential extent of less than 180° and a pair of wedging surfaces at each of the opposite ends of the clamping surface, the clamping surface including a plurality of coaxial, axially spaced, radially inwardly opening segmentally annular grooves, a pair of clamp segments each having an inner arcuate clamping surface and a pair of wedge surfaces arranged to be engaged by apposed pairs of the wedging surfaces of the clamp-halves, the clamping surface of each clamp segment including a plurality of coaxial, axially spaced, radially inwardly opening segmentally annular grooves corresponding to the grooves in the clamp-halves, and means for forcibly urging the clamp-halves together to force the clamp segments inwardly to a position wherein the clamping surface of each segment is circumferentially and axially aligned with the clamping surface of each clamp-half thereby to define a substantially circumferentialy continuous, grooved clamping surface for clamping the hose end about the insert.

Still another object of the invention is to provide such a hose clamp wherein the groove arrangement is constructed to effectively preclude pinching of the hose between the segments and the clamp-halves during make-up of the clamp.

A further object of the invention is to provide such a hose clamp having new and improved means for indicating automatically a made-up condition of the clamp and effectively precluding an over-compression thereof.

Still another object of the invention is to provide such a hose clamp having new and improved means to preclude deformation of the clamp-halves as a result of the wedging engagement between the segments and the clamp-halves during make-up of the clamp.

Other objects and advantages of the invention will be apparent from the following description taken in connection with the accompanying drawings wherein:

FIG. 1 is a side elevation of a hose clamp embodying the invention installed on a hose end;

FIGURE 2 is a top plan view thereof;
FIGURE 3 is a transverse section taken substantially along the line 3—3 of FIGURE 1;
FIGURE 4 is a section of one of the segments of the hose clamp taken substantially along the line 4—4 of FIGURE 5;
FIGURE 5 is a diametric section of one of the segments of the hose clamp taken substantially along the line 5—5 of FIGURE 4; and
FIGURE 6 is a fragmentary longitudinal section taken substantially along the line 6—6 of FIGURE 2.

In the exemplary embodiment of the invention as disclosed in the drawings, a hose clamp generally designated 10 is shown coupled to the end of a high burst-plastic braid type hose 11 of conventional construction. The hose clamp is arranged for positive secured coupling to the hose end notwithstanding the use of extremely high pressures within the hose. Illustratively, the hose may comprise a six layer, spiral wrapped reinforced hose having a rubber sheath 12 with an outside diameter of $4^{15}/_{16}$ inches and an inner diameter of 4 inches.

The hose clamp 10 includes a pair of clamp-halves 13 and 14, a pair of segments 16, and an insert 17, as best seen in FIGURE 3. The clamp-halves comprise generally semi-cylindrical arcuate members each having a pair of outwardly extending flange portions 18 provided with through bores 19 for receiving the shank 20 of securing bolts 21 provided with nuts 22. The cooperating bolts 21 and nuts 22 are arranged to draw the clamp-halves together forcibly in the make-up of the clamp, as will be brought out in greater detail subsequently.

Each clamp-half includes an internal arcuate clamping surface 23 extending circumferentially less than 180° and herein approximately 120°. As shown in FIGURE 6, the clamping surface 23 is provided with a plurality of coaxial, axially spaced, radially inwardly opening secondary annular grooves 24.

Each clamp-half further includes a pair of wedging surfaces 25 at the opposite ends of the clamping surface 23, the wedging surfaces 25 being recessed radially outwardly relative to the clamping surface with a planar chordal shoulder 26 being disposed therebetween.

Each clamp-half still further includes a pair of planar chordal surfaces 27 defining the confronting surfaces of the flange portions 18 of the clamp-halves, as shown in FIGURE 3. The chordal surfaces 27 are arranged to have a preselected spacing therebetween when the arcuate clamping surfaces of the two clamp-halves are disposed to extend circumferentially about a common longitudinal axis.

Referring now more specifically to FIGURES 4 and 5, the segments 16 comprise a segmentally cylindrical inner portion 28 having an internal arcuate clamping surface 29 including a plurality of coaxial, axially spaced, radially inwardly opening segmentally annular grooves 30 corresponding to the grooves 23 in the clamp-halves. The circumferential extent of the inner portion 28 of the segments is slightly less than the circumferential spacing between the apposed chordal surfaces 26 of the assembled clamp-halves, as best seen in FIGURE 3. Each segment is further provided with a pair of generally radially outwardly facing planar wedge surfaces 31 inclined corresponding to the wedge surfaces 25 of the clamp-halves. The angle of the wedging surfaces 25 to the flat plane of the surfaces 27 in the illustrated embodiment is approximately 70°, or 20° from a plane perpendicular to the flat plane of surfaces 27 which may be considered as a diametric plane longitudinally bisecting the clamp-halves. I have found that by maintaining this angle in the range of approximately 70° to 75° improved clamping of the hose end is obtained in the fitting 10 without distortion of the clamp-halves by the wedge forces produced.

Each segment 16 further includes a radially outwardly projecting flange portion 32 having a thickness exactly equal to the desired preselected spacing between the surfaces 27 when the clamp-halves are arranged as shown in FIGURE 3 to dispose the annular clamping surfaces 23 coaxially of each other. The curvature of the grooves 30 of the segments is made to be the same as that of the grooves 23 of the clamp-halves and the wedging surfaces are coordinated positionally therewith so that when the flange surfaces 27 of the clamping-halves are abutted by opposite surfaces 33 of the segment flanges 32 the clamping surfaces 23 and 29 are circumferentially aligned to define a substantially circumferentially continuous grooved clamping surface for clamping the hose end about the insert 17.

The lands 34 of the clamping surface 23 between the grooves 24 thereof and the lands 35 of the clamping surface 29 between the grooves 30 thereof are preferably rounded for improved clamping coaction with the rubber sheath 12 and the hose 11. Illustratively, the lands may be rounded to a radius of approximately .016 inch where the grooves are arcuate in cross section having a radius of approximately $3/16$ inch. In the illustrated embodiment, the outermost grooves 36 of the clamp-halves may have a radius slightly larger than the inner grooves and herein may have a radius of approximately ¼ inch. Similarly, the outermost grooves 37 of the segments may have a larger radius of ¼ inch corresponding to the groove 36 of the clamp-halves.

As indicated above, the circumferential length of each segment portion 28 is slightly less than the circumferential spacing between the clamp-half surfaces 26 in the made-up arrangement of the clamp, as shown in FIGURE 3. Thus, pinching of the hose between the segments and the clamp-halves is effectively precluded. Further to preclude pinching of the hose, the opposite ends 38 of the lands 35 of the segments and the opposite ends of the lands 34 of the clamp-halves are relieved or rounded.

As best seen in FIGURE 6, the insert 17 is provided with a reduced diameter inner portion 40 having an outer hose engaging surface 41 provided with a plurality of sharp annular teeth 42 defined by outwardly widening frusto-conical surfaces 43 and radial annular surfaces 44 in the outer ends of the frusto-conical surfaces. The toothed surface 41 provides an improved gripping of the interior of the hose 11 in cooperation with the rounded land-annularly grooved clamping surfaces of the clamp-halves and segments.

The clamp-halves 13 are axially retained relative to the insert by means of a cooperating annular boss 45 on the insert outwardly of the toothed surface 41 and a cooperating annular groove 46 in the clamp-halves.

In assembling the clamp 10, the user merely firstly inserts the inner portion 40 of the insert 17 into the end of the hose 11 and then places the clamp-halves 13 and segments 16 in loose circumferentially associated assembly about the hose and surrounding the insert portion 40. Bolts 21 are then passed through the bores 19 of the clamp-half flanges 18 and nuts 22 installed thereon. The nuts are then tightened to draw the clamp-halves together until the surfaces 27 of the flanges 18 abut the surfaces 33 of the segment flanges 32 whereupon make-up of the clamp is automatically completed. The hose end is effectively positively retained in the clamp by the improved gripping coaction of the substantially continuous rounded clamping surfaces of the clamp-halves and segments and the cooperating toothed biting surface 41 of the insert 17. Pinching of the hose in the clamp is effectively precluded as discussed above. The coupling is capable of withstanding high pressures within the hose 11 while maintaining positive coupled association with the hose.

If desired, the coupling may be readily disassociated from the hose end by a reversal of the above described assembly steps for reuse as desired. The clamp is simple and economical of manufacture, and assembly thereof is extremely simple and effectively foolproof so that relatively unskilled persons may utilize the clamp.

While I have shown and described one embodiment of my invention, it is to be understood that it is capable of many modifications. Changes, therefore, in the construction and arrangement may be made without departing from the spirit and scope of the invention as defined in the appended claims.

I claim:

1. A hose clamp comprising: an annular insert arranged to be inserted coaxially within a hose end for internally supporting a hose end; a pair of clamp-halves each having an internal arcuate clamping surface for engaging the hose to be clamped along a circumferential extent of less than 180° and a pair of wedging surfaces at each of the opposite ends of the clamping surface, said clamping surface including a plurality of coaxial, axially spaced, radially inwardly opening segmentally annular grooves; a pair of clamp segments each having an inner arcuate clamping surface and a pair of wedge surfaces arranged to be engaged by apposed pairs of said wedging surfaces of said clamp-halves, said clamping surface of each clamp segment including a plurality of coaxial, axially spaced, radially inwardly opening segmentally annular grooves corresponding to said grooves in the clamp-halves; said wedging surfaces being at an angle in the range of approximately 15° to 20° to the diametric plane longitudinally bisecting said clamp-halves, said grooves being arranged on said clamp-halves and said clamp segments to form outermost grooves at the opposite ends of said clamp-halves and said clamp segments and innermost grooves between said outermost grooves, said grooves being rounded with said outermost grooves having a larger radius than said innermost grooves and means for forcibly urging the clamp-halves together to force said clamp segments inwardly to a position wherein said clamping surface of each segment is circumferentially and axially aligned with the clamping surface of each clamp-half thereby to define a substantially circumferentially continuous, grooved clamping surface for clamping the hose end about said insert.

2. The hose clamp of claim 1 wherein said clamping surfaces include lands between said grooves relieved at the opposite ends thereof to preclude pinching of the hose between adjacent pairs of clamp-half and segment land ends.

3. The hose clamp of claim 1 wherein said clamping surfaces include rounded lands between said grooves.

4. A hose clamp comprising: an annular insert arranged to be inserted coaxially within a hose end for internally supporting a hose end; a pair of clamp-halves each having an internal arcuate clamping surface for engaging the hose to be clamped along a circumferential extent of less than 180° and a pair of wedging surfaces at each of the opposite ends of the clamping surface, said clamping surface including a plurality of coaxial, axially spaced, radially inwardly opening segmentally annular grooves; a pair of clamp segments each having an inner arcuate clamping surface and a pair of wedge surfaces arranged to be engaged by apposed pairs of said wedging surfaces of said clamp-halves, said clamping surface of each clamp segment including a plurality of coaxial, axially spaced, radially inwardly opening segmentally annular grooves corresponding to said grooves in the clamp-halves; said wedging surfaces being at an angle in the range of approximately 15° to 20° to the diametric plane longtiudinally bisecting said clamp-halves, said grooves being arranged on said clamp-halves and said clamp segments to form outermost grooves at the opposite ends of said clamp-halves and said clamp segments and innermost grooves between said outermost grooves, said grooves being rounded with said outermost grooves having a larger radius than said innermost grooves, means for forcibly urging the clamp-halves together; and means limiting the movement of the clamp-halves together to a position wherein said clamping surface of each segment is circumferentially and axially aligned with the clamping surface of each clamp-half thereby to define a substantially circumferentially continuous, grooved clamping surface for clamping the hose end about said insert.

5. The hose clamp of claim 4 wherein said movement limiting means comprises a flange on said clamp segments and stop surfaces on said clamp-halves abutting opposite sides of said flange when said clamping surfaces are aligned.

6. The hose clamp of claim 4 wherein the circumferential extent of the clamping surfaces totals less than 360° whereby the clamping surface of each segment is circumferentially spaced from the clamping surface of the clamp-halves when the clamping surfaces are circumferentially aligned.

7. A hose clamp comprising: an annular insert arranged to be inserted coaxially within a hose end for internally supporting a hose end, said insert having a plurality of radially outer, annular, sharp teeth for biting engagement with said hose; a pair of clamp-halves each having an internal arcuate clamping surface for engaging the hose to be clamped along a circumferential extent of less than 180° and a pair of wedging surfaces at each of the opposite ends of the clamping surface, said clamping surface including a plurality of coaxial, axially spaced, radially inwardly opening segmentally annular grooves with rounded lands therebetween; a pair of clamp segments each having an inner arcuate clamping surface and a pair of wedge surfaces arranged to be engaged by apposed pairs of said wedging surfaces of said clamp-halves, said clamping surface of each clamp segment including a plurality of coaxial, axially spaced, radially inwardly opening segmentally annular grooves with rounded lands therebetween and corresponding to said grooves in the clamp-halves; said wedging surfaces being at an angle in the range of approximately 15° to 20° to the diametric plane longitudinally bisecting said clamp-halves, said grooves being arranged on said clamp-halves and said clamp segments to form outermost grooves at the opposite ends of said clamp-halves and said clamp segments and innermost grooves between said outermost grooves, said grooves being rounded with said outermost grooves having a larger radius than said innermost grooves and means for forcibly urging the clamp-halves together to force said clamp segments upwardly to a position wherein said clamping surface of each segment is circumferentially and axially aligned with the clamping surface of each clamp-half thereby to define a substantially circumferentially continuous, grooved clamping surface for clamping the hose end about said insert.

References Cited by the Examiner

UNITED STATES PATENTS

| | | | |
|---|---|---|---|
| 237,324 | 2/1881 | Reynolds | 285—253 |
| 591,796 | 10/1897 | De Wolf | 285—253 |
| 1,006,294 | 10/1911 | Schubart | 24—284 |
| 1,532,596 | 4/1925 | Madsen | 285—253 X |
| 2,165,920 | 7/1939 | Burnip | 285—373 X |
| 2,944,841 | 7/1960 | Carpenter | 285—243 |
| 3,142,502 | 7/1964 | Luther | 285—242 |

FOREIGN PATENTS

| | | |
|---|---|---|
| 493,132 | 1/1950 | Belgium. |
| 86 | 1898 | Great Britain. |

CARL W. TOMLIN, *Primary Examiner.*

THOMAS F. CALLAGHAN, *Examiner.*